United States Patent
Rakshit et al.

(10) Patent No.: US 10,838,363 B2
(45) Date of Patent: Nov. 17, 2020

(54) INTERACTIVE COORDINATION BETWEEN PHYSICAL AND HOLOGRAPHIC OBJECTS INVOLVING DISPLAYING HOLOGRAM OF MISSING SHAPE OF OBJECT

(71) Applicant: INTERNATIONAL BUSINESS MACHINES CORPORATION, Armonk, NY (US)

(72) Inventors: Sarbajit K. Rakshit, Kolkata (IN); Sathya Santhar, Ramapuram (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 16/038,141

(22) Filed: Jul. 17, 2018

(65) Prior Publication Data
US 2020/0026239 A1    Jan. 23, 2020

(51) Int. Cl.
*G03H 1/00* (2006.01)
*G03H 1/22* (2006.01)
(Continued)

(52) U.S. Cl.
CPC ......... *G03H 1/2249* (2013.01); *G03H 1/0005* (2013.01); *G06T 7/73* (2017.01); *G06T 19/20* (2013.01); *G03H 2001/0061* (2013.01)

(58) Field of Classification Search
CPC ............... G03H 1/0005; G03H 1/2249; G03H 2001/0033; G03H 2001/0038; G03H 2001/0044; G03H 2001/0055; G03H 2001/0061; G03H 2001/0083; G03H 2001/0088; G03H 2001/2223;
(Continued)

(56) References Cited

U.S. PATENT DOCUMENTS 10,331,110 B2 * 6/2019 Lection ................. B29C 64/124
2011/0019155 A1 1/2011 Daniel et al.
(Continued)

OTHER PUBLICATIONS

Microsoft Hololens, [online], [retrieved on Jul. 13, 2018], Retrieved from the Internet: <https://www.microsoft.com/en-us/hololens/commercial-overview>.

*Primary Examiner* — Ryan S Dunning
(74) *Attorney, Agent, or Firm* — Law Offices of Ira D. Blecker, P.C.

(57) ABSTRACT

A method that includes: recognizing by an object recognition device a physical object; comparing by the object recognition device the physical object with a fully completed object; identifying by the object recognition device a spatial position, an orientation and physical dimensions of the partially-completed physical object; creating by a three-dimensional (3D) modeling program a 3D model of the partially-completed physical object using the spatial position, the orientation and physical dimensions of the partially-completed physical object; inputting by the 3D modeling program to a holographic creation system a missing shape of the partially-completed physical object, the missing shape being a complementary portion of the partially-completed physical object; creating by the holographic creation system a 3D hologram of the complementary portion; displaying by a holographic projector the 3D hologram of the complementary portion adjacent to the partially-completed physical object.

18 Claims, 5 Drawing Sheets

(51) Int. Cl.
*G06T 7/73* (2017.01)
*G06T 19/20* (2011.01)

(58) Field of Classification Search
CPC ... G03H 2001/2252; G03H 2001/2273; G03H 2001/2284; G03H 2210/30; G03H 2210/32; G03H 2210/33; G03H 2210/36; G03H 2227/02; G06T 7/73; G06T 7/74; G06T 7/75; G06T 15/00; G06T 17/10; G06T 17/20; G06T 17/30; G06T 19/006; G06T 19/20; G06K 9/00201; G06K 9/00208; G06K 9/00214
USPC .................. 359/9, 13, 22–26, 32, 33, 35
See application file for complete search history.

(56) References Cited

U.S. PATENT DOCUMENTS

| | | |
|---|---|---|
| 2011/0169924 A1 | 7/2011 | Haisty et al. |
| 2014/0049559 A1 | 2/2014 | Fleck et al. |
| 2016/0263345 A1* | 9/2016 | Shuster .................. A61F 2/72 |

\* cited by examiner

INTERACTIVE COORDINATION BETWEEN PHYSICAL AND HOLOGRAPHIC OBJECTS INVOLVING DISPLAYING HOLOGRAM OF MISSING SHAPE OF OBJECT

BACKGROUND

The present exemplary embodiments pertain to holographic displays in which the displayed object is a three dimensional holographic image and, more particularly, to holographic displays in which a holographic object is displayed as complementary to a partially-completed physical object.

Next generation computer systems may use holographic objects for various user interactions. The user may have the feeling of interacting with digital objects while performing any activity with the physical objects.

BRIEF SUMMARY

The various advantages and purposes of the exemplary embodiments as described above and hereafter are achieved by providing, according to an aspect of the exemplary embodiments, a computer-implemented method for interactive coordination between physical and holographic objects, the method comprising: recognizing by an object recognition device a physical object; comparing by the object recognition device the physical object with a fully completed object to determine that the physical object is a partially-completed object; identifying by the object recognition device a spatial position, an orientation and physical dimensions of the partially-completed physical object; creating by a three-dimensional (3D) modeling program a 3D model of the partially-completed physical object using the spatial position, the orientation and physical dimensions of the partially-completed physical object; inputting by the 3D modeling program to a holographic creation system a missing shape of the partially-completed physical object, the missing shape being a complementary portion of the partially-completed physical object; creating by the holographic creation system a 3D hologram of the complementary portion; displaying by a holographic projector the 3D hologram of the complementary portion adjacent to the partially-completed physical object, the 3D hologram of the complementary portion being viewable by the unaided naked eye, wherein the method is performed by a processor.

According to another aspect of the exemplary embodiments, there is provided a computer program product for interactive coordination between physical and holographic objects, the computer program product comprising a computer readable storage medium having program instructions embodied therewith, the program instructions executable by a processor to cause the processor to perform a method comprising: recognizing by an object recognition device a physical object; comparing by the object recognition device the physical object with a fully completed object to determine that the physical object is a partially-completed object; identifying by the object recognition device a spatial position, an orientation and physical dimensions of the partially-completed physical object; creating by a three-dimensional (3D) modeling program a 3D model of the partially-completed physical object using the spatial position, the orientation and physical dimensions of the partially-completed physical object; inputting by the 3D modeling program to a holographic creation system a missing shape of the partially-completed physical object, the missing shape being a complementary portion of the partially-completed physical object; creating by the holographic creation system a 3D hologram of the complementary portion; and displaying by a holographic projector the 3D hologram of the complementary portion adjacent to the partially-completed physical object, the 3D hologram of the complementary portion being viewable by the unaided naked eye.

According to a further aspect of the exemplary embodiments, there is provided a system for interactive coordination between physical and holographic objects comprising: an object recognition device; a holographic projector; a non-transitory storage medium that stores instructions; and a processor that executes the instructions. The processor executes the instructions to perform: recognizing by the object recognition device a physical object; comparing by the object recognition device the physical object with a fully completed object to determine that the physical object is a partially-completed object; identifying by the object recognition device a spatial position, an orientation and physical dimensions of the partially-completed physical object; creating by a three-dimensional (3D) modeling program a 3D model of the partially-completed physical object using the spatial position, the orientation and physical dimensions of the partially-completed physical object; inputting by the 3D modeling program to a holographic creation system a missing shape of the partially-completed physical object, the missing shape being a complementary portion of the partially-completed physical object; creating by the holographic creation system a 3D hologram of the complementary portion; displaying by the holographic projector the 3D hologram of the complementary portion adjacent to the partially-completed physical object, the 3D hologram of the complementary portion being viewable by the unaided naked eye.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

A holographic object is basically a physical representation of digital objects. Three dimensional (3D) holographic projectors may project 3D holographic objects on a surface or in air. Using holographic technology, the holographic projectors may project various type of holographic objects.

A physical object has physical properties, such as weight, inertia, kinetic energy.

The exemplary embodiments propose a 3D holographic projection ecosystem that may have an object recognition apparatus that may scan physical objects present in the ecosystem, find any physical objects that may be partially completed and then plot and display a complementary holographic object to complete the partially-completed physical object.

The 3D holographic projection ecosystem may recognize the partially-completed physical objects and may identify an appropriate complementary portion of the partially-completed physical object. The holographic projector may project the complementary portion over the partially created physical object.

Based on the progress of the partially-completed physical object, the object recognition apparatus software may periodically identify a complementary holographic object and if the complementary holographic object has changed, the newer version of the complementary holographic object may be displayed.

The proposed ecosystem may analyze the dimensions of the partially-completed physical objects and thereafter may adjust the dimensions of the complementary holographic objects. The user may change the dimensions of the partially-completed physical object at any point of time and thereafter the complementary holographic objects may also be adjusted.

Figure 1:
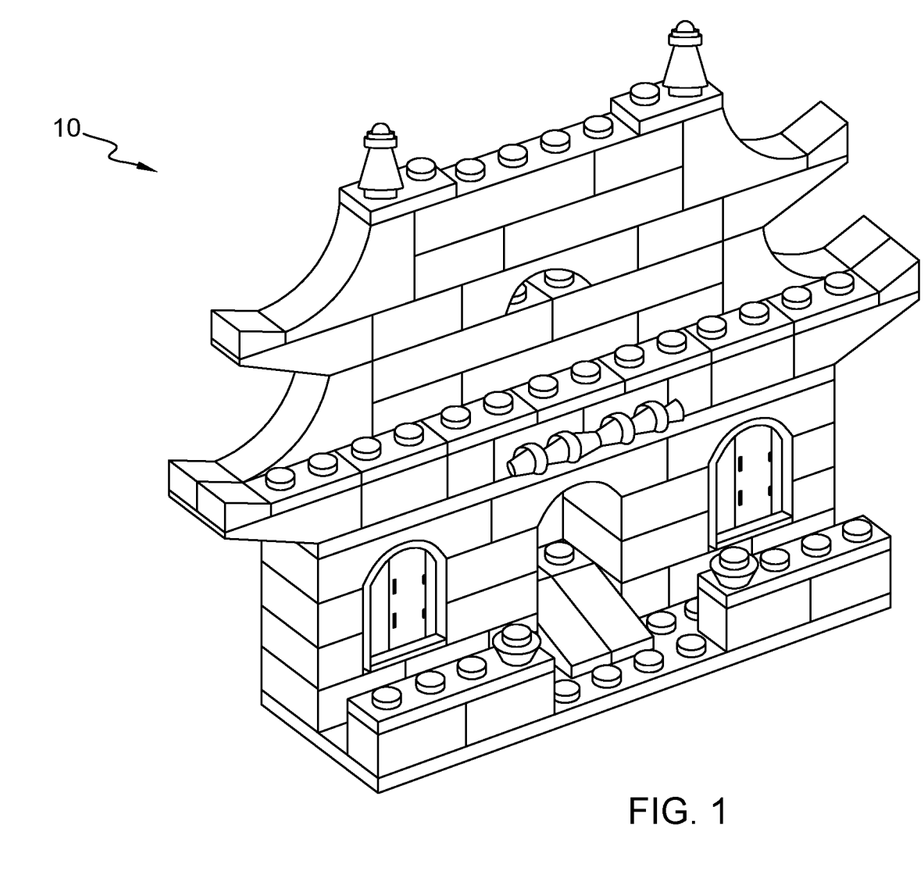
FIG. 1 illustrates a fully completed physical object.

Referring to the Figures in more detail and particularly referring to FIG. 1, there is shown a fully completed physical object 10, which in this case is a model of a building. The model has been created using toy blocks. The particular physical object and the method of making the physical object are unimportant to the exemplary embodiments.

During the construction of the physical object 10, a partially-completed physical object 10 may be created and the person making the physical object 10 may be unsure how to complete the physical object 10. Accordingly, it would be advantageous to have a guide to completing the physical object 10.

Figure 2:
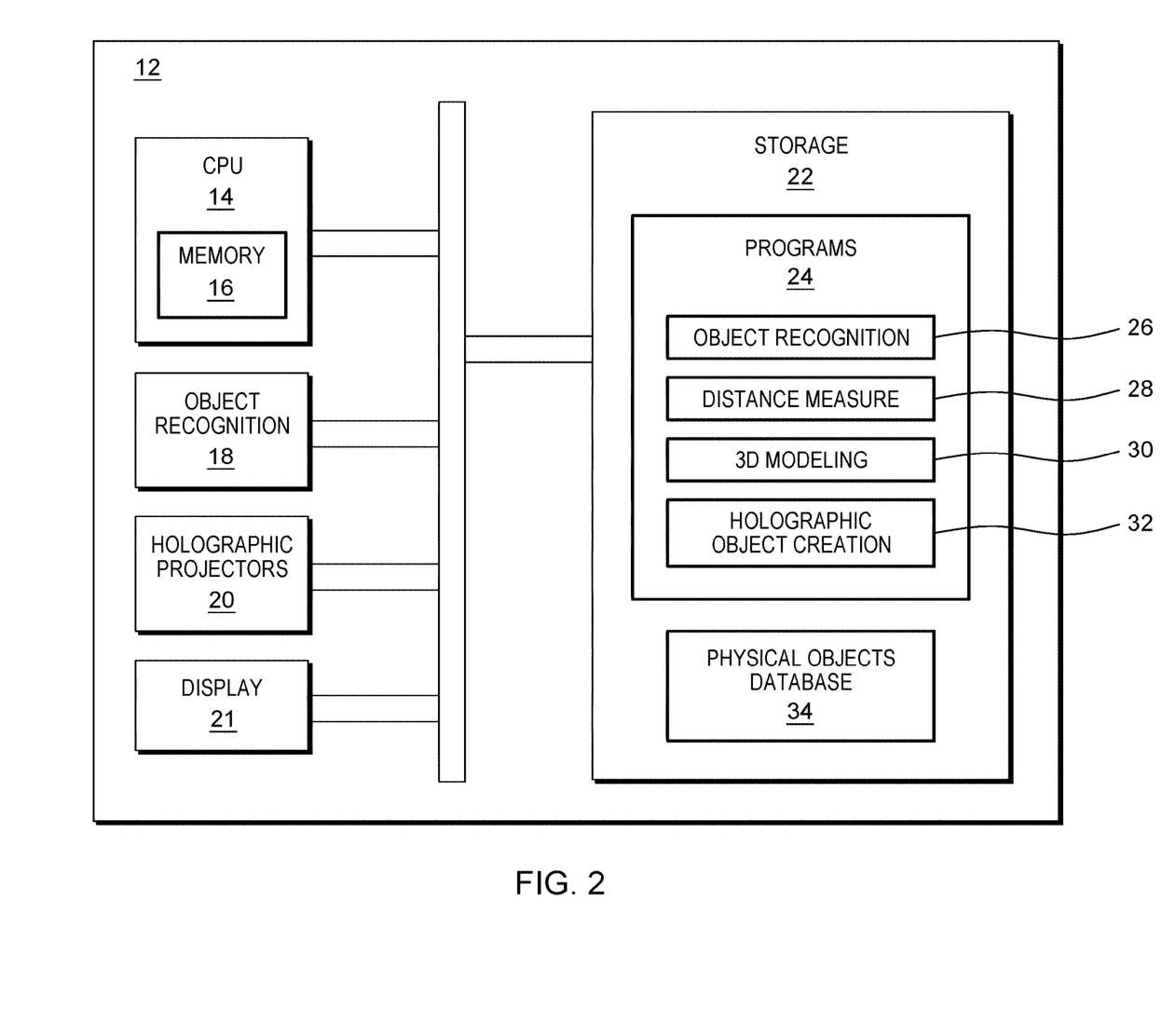
FIG. 2 illustrates an electronic device for recognizing a partially-created physical object and then providing a complementary holographic object.

Referring now to FIG. 2, there is illustrated an electronic device 12 for recognizing the partially-created physical object 10 and then providing a complementary holographic object to create or at least partially complete the partially-completed physical object 10.

Included within the electronic device 12 may be a processor such as central processing unit (CPU) 14 having memory 16. The electronic device 12 may include object recognition instructions 18 to operate an object recognition device, holographic projector instructions 20 to operate one or holographic projectors and display instructions 21 to operate a display.

Also included within electronic device 12 may be storage 22 having computer programs 24. Storage 22 may be resident within the electronic device 12 or may be remotely located such as in the cloud. Among the computer programs 24 may be an object recognition program 26 to receive input from an object recognition device and process the input to determine a shape, orientation and spatial position of the physical object 10. Further included in the computer programs 24 may be a distance measurement program 28 that may work in conjunction with the object recognition device to determine the dimensions of the physical object 10.

Further included within computer programs 24 may be a 3D modeling program 30 for modeling of the complementary holographic object and a holographic object creation program 32 to create the complementary holographic object.

The storage 22 may further include a physical objects database 34 in which images of physical objects may be stored for reference later.

Figure 3:
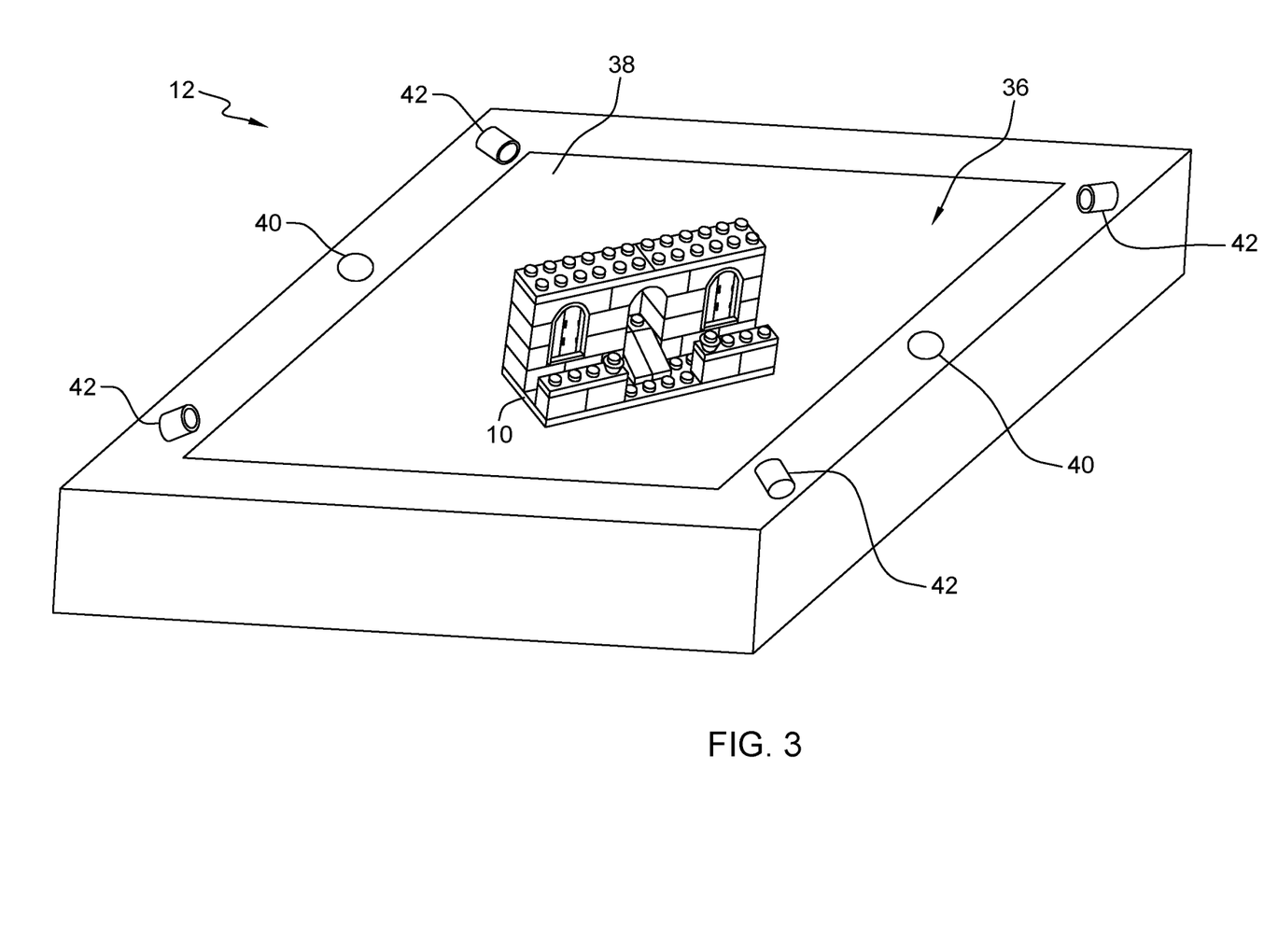
FIG. 3 illustrates an exemplary electronic device on which is placed a partially-completed physical object.

Referring now to FIG. 3, there is illustrated an exemplary embodiment of the electronic device 12 in which there may be a display 36 which may display typical digital images but may also display holographic objects such as a 3D complementary holographic object.

The display 36 may have a display surface 38. For purposes of illustration and not limitation, the electronic device 12 is a smartphone but could also be any electronic device having a display such as a tablet or a laptop. For larger physical objects 10 as contemplated by the exemplary embodiments, the electronic device 12 may be a larger electronic device such as a tabletop touchscreen monitor.

The electronic device 12 may include one or more object recognition devices 40 for recognizing the shape, spatial position and orientation of the physical objects. For purposes of illustration and not limitation, the object recognition devices 40 may include devices for scanning the physical objects 10 using ultrasonic, infrared and/or visual scanning. The object recognition program 26 may process the images from the object recognition devices 40 to determine the shape, orientation and spatial position of the physical objects 10.

The electronic device 12 may further include a plurality of holographic projectors 42 which may project a complementary holographic object in reference to the physical object 10. Some of the holographic projectors 42 may be on one side of the display 36 while other of the holographic projectors 42 may be on the other side of the display 36.

As shown in FIG. 3, the partially-completed physical object 10 has been placed on the display surface 38. Placing the partially-completed physical object 10 on the display surface 36 is not required but it is convenient so that a user does not have to hold it up. All that is required is that the partially-completed physical object 10 is within range of the object recognition devices 40 and the holographic projector 42. Thus, the partially-completed physical object 10 may be spaced a distance away from the display surface 38.

Figure 4:
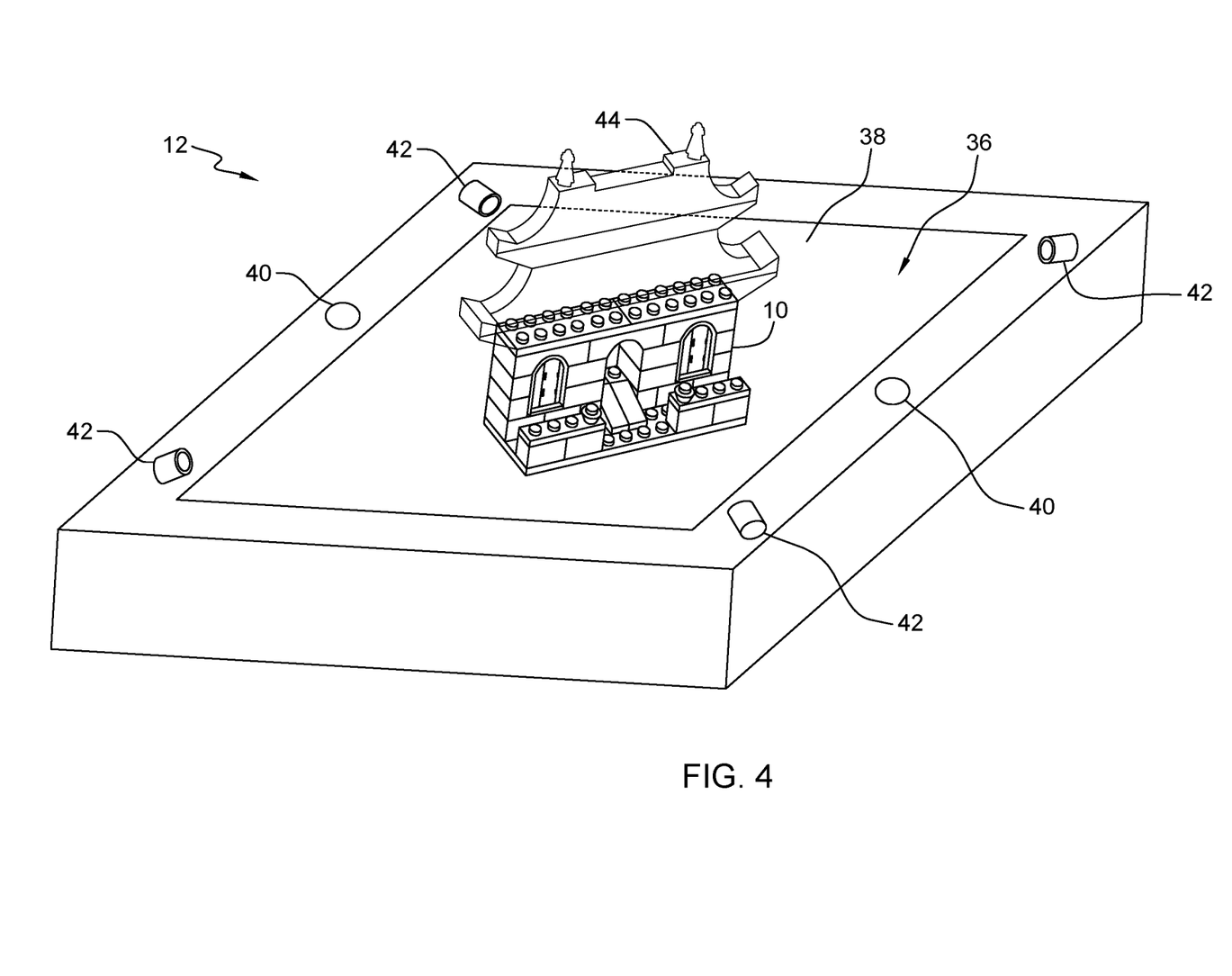
FIG. 4 illustrates the exemplary electronic device of FIG. 3 and further illustrates a complementary holographic object which has been formed on the partially-completed physical object.

Referring now to FIG. 4, the partially-completed physical object 10 has been recognized by the object recognition devices 40 and the object recognition program 26 has determined its shape, orientation and spatial position. The distance measurement program 28 has determined the dimensions of the partially-completed physical object 10. This input from the object recognition program 26 and distance measurement program 28 is inputted to the 3D modeling program 30 from which it is determined the missing shape of the partially-completed physical object 10. If the fully completed shape of the partially-completed physical object 10 is not known, reference may be made to the physical objects database 34 to find the fully completed shape. Reference may also be made to the Internet to search for the fully completed shape.

The 3D modeling program may input the missing shape of the partially-completed physical object 10 to the holographic object creation program 32 which may then make a hologram to be displayed by the holographic projectors 42. The missing shape may be displayed as a hologram, hereafter referred to as complementary holographic object 44.

It is noted that the complementary holographic object 44 is a complement to the partially-completed physical object 10 and displays by a hologram the missing structure of the partially-completed physical object 10. The complementary holographic object 44 is thus displayed adjacent to the partially-completed physical object 10 to show the missing structure although a small portion of the complementary holographic object 44 may overlap with the partially-completed physical object 10. A user may then follow the structure outlined in the complementary holographic object 44 to complete the partially-completed physical object 10.

The complementary holographic object 44 is displayed as a hologram viewable with the naked eye so that no special glasses are needed to view the hologram.

From time to time, as determined by a user or as programmed into the electronic device 12, the partially-completed physical object 10 may be scanned and if structure has been added to or taken away from the partially-completed physical object 10, the 3D model program 30 may take this into account and through the holographic object creation program 32 and the holographic projectors 42, display a modified complementary holographic object 44.

It should be understood that a user may manually change the dimensions, shape, spatial position and orientation of the partially-completed physical object 10 so as to cause corresponding changes to the complementary holographic object 44.

In one or more exemplary embodiments, there is a method for interactive coordination between physical and holographic objects.

Figure 5:
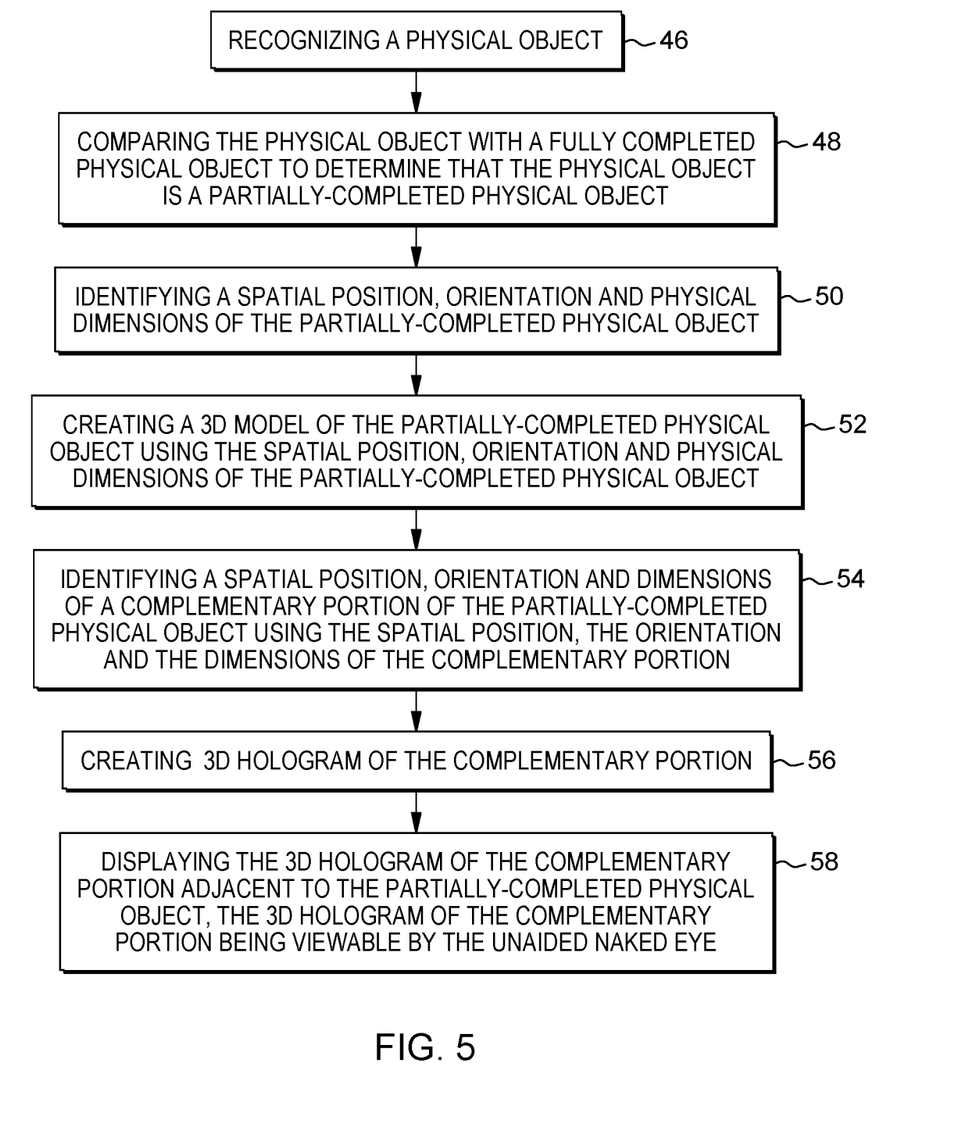
FIG. 5 illustrates a method for interactive coordination between physical and holographic objects.

Referring now to FIG. 5, the method may begin by recognizing by an object recognition device a physical object, box 46.

The physical object may be compared by the object recognition device with a fully completed physical object to determine that the physical object is a partially-completed object, box 48.

The object recognition apparatus may identify a spatial position, orientation and physical dimensions of the partially-completed physical object, box 50.

A three-dimensional (3D) modeling program may create a 3D model of the partially-completed physical object using the spatial position, orientation and physical dimensions of the partially-completed physical object, box 52.

The object recognition device may identify a spatial position, orientation and dimensions of a complementary portion of the partially-completed physical object using the spatial position, the orientation and the dimensions of the complementary portion, box 54.

A holographic object creation program may create a 3D hologram of the complementary portion, box 56.

Finally, a holographic projector may display the 3D hologram of the complementary portion adjacent to the partially-completed physical object, the 3D hologram of the complementary portion being viewable by the unaided naked eye, box 58.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method for interactive coordination between physical and holographic objects, the method comprising:
    recognizing by an object recognition device a physical object, having physical properties;
    comparing by the object recognition device the physical object with a fully completed object to determine that the physical object is a partially-completed object;
    identifying by the object recognition device a spatial position, an orientation and physical dimensions of the partially-completed physical object;
    creating by a three-dimensional (3D) modeling program a 3D model of the partially-completed physical object using the spatial position, the orientation and physical dimensions of the partially-completed physical object;
    inputting by the 3D modeling program to a holographic creation system a missing shape of the partially-completed physical object, the missing shape being a complementary portion of the partially-completed physical object;
    creating by the holographic creation system a 3D hologram of the complementary portion;
    displaying by a holographic projector the 3D hologram of the complementary portion in the physical location adjacent to the partially-completed actual physical object having physical properties, the 3D hologram of the complementary portion being viewable by the unaided naked eye;
    wherein the method is performed by a processor.

2. The method of claim 1 further comprising periodically scanning by the object recognition device the partially-completed physical object for a change to the physical object;
    responsive to any change to the physical object, modifying the 3D hologram of the complementary portion to be consistent with the change to the physical object; and
    displaying the modified 3D hologram adjacent to the partially-completed physical object and in place of any prior modified 3D hologram displayed.

3. The method of claim 1 wherein the object recognition device comprises ultrasound, infrared or visual image.

4. The method of claim 2 wherein responsive to input by a user, changing any one of the spatial position, the orientation or the physical dimensions of the partially-completed physical object.

5. The method of claim 1 wherein responsive to input by a user, using the object recognition device to identify the partially-completed physical object.

6. The method of claim 1 wherein there are a plurality of partially-completed physical objects and a plurality of 3D holograms of complementary portions corresponding to the plurality of partially-completed physical objects.

7. A computer program product for interactive coordination between physical and holographic objects, the computer program product comprising a computer readable storage medium having program instructions embodied therewith, the program instructions executable by a processor to cause the processor to perform a method comprising:
    recognizing by an object recognition device a physical object, having physical properties;
    comparing by the object recognition device the physical object with a fully completed object to determine that the physical object is a partially-completed object;
    identifying by the object recognition device a spatial position, an orientation and physical dimensions of the partially-completed physical object;
    creating by a three-dimensional (3D) modeling program a 3D model of the partially-completed physical object using the spatial position, the orientation and physical dimensions of the partially-completed physical object;
    inputting by the 3D modeling program to a holographic creation system a missing shape of the partially-completed physical object, the missing shape being a complementary portion of the partially-completed physical object;
    creating by the holographic creation system a 3D hologram of the complementary portion;
    displaying by a holographic projector the 3D hologram of the complementary portion in the physical location adjacent to the partially-completed actual physical object having physical properties, the 3D hologram of the complementary portion being viewable by the unaided naked eye.

8. The computer program product of claim 7 further comprising periodically scanning by the object recognition device the partially-completed physical object for a change to the physical object;
    responsive to any change to the physical object, modifying the 3D hologram of the complementary portion to be consistent with the change to the physical object; and
    displaying the modified 3D hologram adjacent to the partially-completed physical object and in place of any prior modified 3D hologram displayed.

9. The computer program product of claim 7 wherein the object recognition device comprises ultrasound, infrared or visual image.

10. The computer program product of claim 8 wherein responsive to input by a user, changing any one of the spatial position, the orientation or the physical dimensions of the partially-completed physical object.

11. The computer program product of claim 7 wherein responsive to input by a user, using the object recognition device to identify the partially-completed physical object.

12. The computer program product of claim 7 wherein there are a plurality of partially-completed physical objects and a plurality of 3D holograms of complementary portions corresponding to the plurality of partially-completed physical objects.

13. A system for interactive coordination between physical and holographic objects comprising:
    an object recognition device;
    a holographic projector;
    a non-transitory storage medium that stores instructions; and
    a processor that executes the instructions to perform:
    recognizing by the object recognition device a physical object, having physical properties;
    comparing by the object recognition device the physical object with a fully completed object to determine that the physical object is a partially-completed object;
    identifying by the object recognition device a spatial position, an orientation and physical dimensions of the partially-completed physical object;
    creating by a three-dimensional (3D) modeling program a 3D model of the partially-completed physical object using the spatial position, the orientation and physical dimensions of the partially-completed physical object;
    inputting by the 3D modeling program to a holographic creation system a missing shape of the partially-completed physical object, the missing shape being a complementary portion of the partially-completed physical object;
    creating by the holographic creation system a 3D hologram of the complementary portion;
    displaying by the holographic projector the 3D hologram of the complementary portion in the physical location adjacent to the partially-completed actual physical object having physical properties, the 3D hologram of the complementary portion being viewable by the unaided naked eye.

14. The system of claim 13 wherein the processor that executes the instructions to further perform:
    periodically scanning by the object recognition device the partially-completed physical object for a change to the physical object;
    responsive to any change to the physical object, modifying the 3D hologram of the complementary portion to be consistent with the change to the physical object; and
    displaying the modified 3D hologram adjacent to the partially-completed physical object and in place of any prior modified 3D hologram displayed.

15. The system of claim 13 wherein the object recognition device comprises ultrasound, infrared or visual image.

16. The system of claim 14 wherein responsive to input by a user, changing any one of the spatial position, the orientation or the physical dimensions of the partially-completed physical object.

17. The system of claim 13 wherein responsive to input by a user, using the object recognition device to identify the partially-completed physical object.

18. The system of claim 13 wherein there are a plurality of partially-completed physical objects and a plurality of 3D holograms of complementary portions corresponding to the plurality of partially-completed physical objects.

\* \* \* \* \*